Patented Feb. 24, 1953

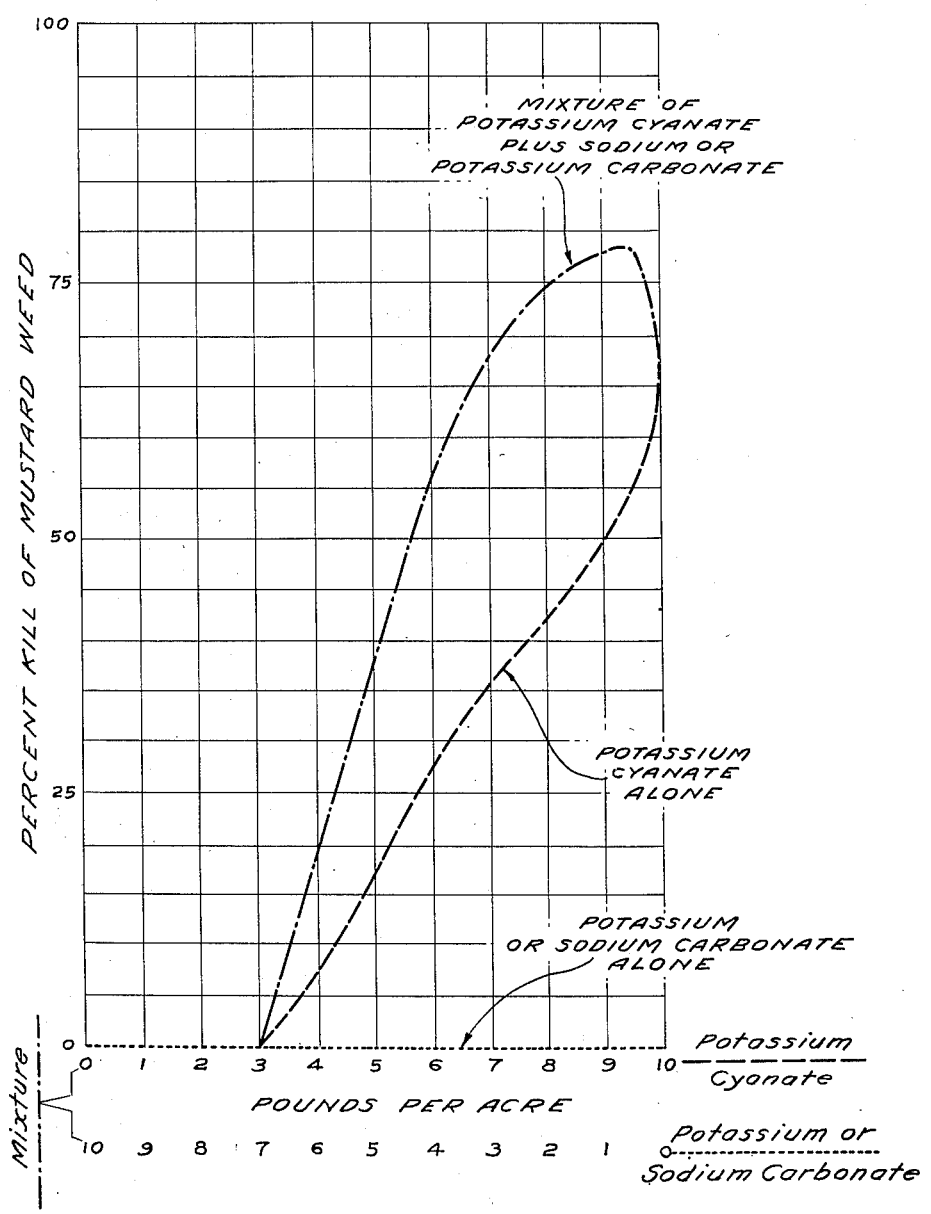

2,629,655

UNITED STATES PATENT OFFICE 2,629,655

METHOD OF KILLING WEEDS

Frank L. Stark, Jr., Stamford, Conn., assignor to American Cyanamid Company, New York, N. Y., a corporation of Maine Application October 26, 1950, Serial No. 192,198

2 Claims. (Cl. 71—2.2)

The present invention relates to plant husbandry, and more particularly to methods for destroying weeds.

Throughout this specification and the appended claims, the term "weed" is used in its broadest sense to indicate unwanted vegetation.

A principal object of the present invention is to provide an improved method for destroying growing weeds. Another important object is to provide a method for selectively killing weeds whereby the weed is readily destroyed and the desired vegetation growing in the same area is not permanently injured.

The above objects are attained by employing a synergistic weed-killing composition comprising from 40 to 98 parts of potassium cyanate and from 60 to 2 parts of a member of the group consisting of potassium carbonate, sodium carbonate, and a mixture thereof.

The cyanate-carbonate compositions of this invention may be effectively used to kill weeds and/or their seeds by application thereto of requisite dosages either in liquid or in solid form, the former preferably in water and the latter with inert diluents such as talc, clay, kieselguhr, and the like. The compositions are usually applied at a rate equal to from 3 to 75 lbs. per acre.

The compositions of the present invention are particularly efficient in the killing of dicotyledonous plants. This is important as most unwanted vegetation in lawns is of the dicotyledonous family while desirable grasses are of the monocotyledonous family. Moreover, crab grass, an annual monocotyledonous plant and usually looked upon as an undesirable weed in a lawn area comprising perennial grasses, is also susceptible to the action of the present compositions while perennial grasses are not.

The data set forth in the accompanying drawing is a typical illustration of the surprising herbicidal activity of the compositions of the present invention in contrast to the control obtained with the potassium cyanate alone. Inasmuch as the potassium or sodium carbonate alone gave no kill, it was surprising to find that by using the carbonate in combination with the cyanate, activity superior to that of the potassium cyanate alone resulted.

A composition comprising about 91 parts of potassium cyanate and 9 parts potassium carbonate has been found particularly suitable for the selective weeding of onions in that it is effective against pussley, one of the most difficult weeds to control in the onion field. For killing weeds among small seedling onions, the cyanate-carbonate composition may be used at a rate of 5 lbs. per acre, the composition being dissolved in 60 gals. of water and applied as a spray. Where the onions are 6 in. high or larger, the weed-killing composition is usually applied at a rate of 10 lbs. per acre. Other weeds growing in onion fields, such a smartweed, common chickweed, ragweed, pigweed, henbit, Jerusalem oak, and wild ageratum, are readily controlled by spray applications of the cyanate-carbonate compositions.

The compositions of the present invention can also be used for the selective control of annual weeds in such crops as Gladioli, Irises, Narcissi and other similar ornamental crops, for the control of weeds in other monocotyledonous crops such as asparagus, corn, sugar cane, small grains, rice, etc. Furthermore, dicotyledonous plants such as peas, crucifers, flax, and carnations, which have a heavy bloom on their leaves, can be selectively weeded with the present compositions providing no wetting agent is used in the spray or dust formulation. These compositions can also be used for the top-killing of certain plants such as potatoes, tomatoes, etc., and for the defoliation of such plants as cotton, beans, legumes and the like.

There are many other weeds susceptible to the action of the above cyanate-carbonate compositions. When hard to wet plants are to be killed, any of the usual wetting agents may be used and preferably in the form of a spray solution. Such plants include grasses and sedges, wild onions, spotted smartweed, lambs-quarters, and evening primrose. Wetting agents are of little or no value on plants that are easily wet such as field sorrel, common chickweed, sheep sorrel, butter and eggs, rough fruited cinquefoil, daisy fleabane, winter cress, wild carrot, hedge bindweed, broad-leafed dock, yarrow, grass-leaved stitchwort, bull thistle and burdock.

The weed-killing compositions of the present invention are relatively non-toxic to human beings and cattle, are easy and economical to apply, are non-corrosive to equipment, have no offensive odor, involve no fire hazard, are stable in storage, are compatible with most insecticidal chemicals, and may be used in conjunction with other herbicides as desired.

The present application is a continuation-in-part of my copending application, Serial No. 106,840, filed July 26, 1949, now abandoned.

While the invention has been described with particular reference to specific embodiments, it is to be understood that it is not to be limited thereto but is to be construed broadly and restricted solely by the scope of the appended claims.

I claim:

1. A method of killing weeds which includes applying thereto a synergistic weed-killing composition comprising from 40 to 98 parts of potassium cyanate and from 60 to 2 parts of a member of the group consisting of potassium carbonate, sodium carbonate, and a mixture thereof.

2. A method of killing weeds which includes applying thereto a synergistic weed-killing composition comprising 91 parts of potassium cyanate and 9 parts of potassium carbonate.

FRANK L. STARK, JR.

REFERENCES CITED

The following references are of record in the file of this patent:

UNITED STATES PATENTS

| Number | Name | Date |
|---|---|---|
| 2,334,723 | Neumark et al. | Nov. 23, 1943 |
| 2,345,826 | Neumark | Apr. 4, 1944 |
| 2,368,601 | Torley | Jan. 30, 1945 |

OTHER REFERENCES

Chemical Abstracts, vol. 42 (1948), col. 8404, abstract of article by Hedlin in Proc. Amer. Soc. Hort. Sci. 51 (1948).